United States Statutory Invention Registration [19]

[11] Reg. Number: H52

Brackenbury

[45] Published: Apr. 1, 1986

[54] HEAT EXCHANGER

[75] Inventor: Phillip J. Brackenbury, Richland, Wash.

[73] Assignee: The United States of America as represented by the United States Department of Energy, Washington, D.C.

[21] Appl. No.: 559,505

[22] Filed: Dec. 8, 1983

[51] Int. Cl.[4] ..... B22C 13/02

[52] U.S. Cl. ..... 165/158; 165/72; 165/75; 165/161; 165/176

[58] Field of Search ..... 165/158, 72, 75, 176, 165/161

[56] References Cited

U.S. PATENT DOCUMENTS

| | | | |
|---|---|---|---|
| 1,662,615 | 3/1928 | McNeal | 165/158 |
| 1,811,402 | 6/1931 | McNeal | 165/72 |
| 1,862,310 | 6/1932 | How | 165/72 |
| 1,884,555 | 10/1932 | Brown | 165/176 |
| 1,897,213 | 2/1933 | Price et al. | 165/72 |
| 1,967,781 | 7/1934 | Potter et al. | 165/72 |
| 2,766,903 | 10/1956 | Boni, Jr. | 165/72 |
| 2,900,173 | 8/1959 | Pickford | 165/158 |

FOREIGN PATENT DOCUMENTS

| | | | |
|---|---|---|---|
| 1153780 | 4/1962 | Fed. Rep. of Germany | 165/161 |
| 52981 | 8/1942 | Netherlands | 165/162 |
| 375989 | 7/1932 | United Kingdom | 165/158 |
| 1380376 | 1/1964 | France | 165/176 |

*Primary Examiner*—Donald P. Walsh
*Attorney, Agent, or Firm*—Robert Southworth, III; Judson R. Hightower

[57] ABSTRACT

A heat exchanger comparising a shell attached at its open end to one side of a tube sheet and a detachable head connected to the other side of said tube sheet. The head is divided into a first and second chamber in fluid communication with a nozzle inlet and nozzle outlet, respectively, formed in said tube sheet. A tube bundle is mounted within said shell and is provided with inlets and outlets formed in said tube sheet in communication with said first and second chambers, respectively.

7 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEAT EXCHANGER

The U.S. Government has rights in this invention pursuant to Contract No. DE-AC06-76FF02170 between the U.S. Department of Energy and Westinghouse Electric Corporation.

BACKGROUND OF THE INVENTION

This invention relates generally to heat exchangers and, more particularly, to a heat exchanger employed in a hostile, radioactive environment.

One of the critical problems encountered in the development of nuclear energy is that substantially all inspection and maintenance of test and operative facilities and the equipment associated therewith must be remotely performed. Even the various fluid flow systems supporting such development must be contained in shielded cells or rooms to protect personnel. For example, in a proposed radiation test facility employing an accelerated deuteron-lithium stripping reaction to generate a high energy neutron source, the liquid lithium circulating or loop system, including the pump, heat exchanger, and various other components, are completely enclosed within a shielded containment. Conventional heat exchangers would pose problems in such an enclosed, hostile environment since the coolant inlet and outlet nozzles form a part of the heat exchanger's bonnet or head and must be uncoupled from their associated pipe connections before the head can be removed from the body of the exchanger. This is an arduous and time consuming task when done by remotely controlled manipulators and seriously impedes maintenance and inspection. Moreover, these uncoupling procedures are further complicated by the limited or restricted space provided in these shielded enclosures.

Accordingly, it is a primary object of the present invention to obviate the above noted shortcomings by providing a new and useful heat exchanger facilitating remote inspection and maintenance thereof.

It is another object of this invention to provide in the foregoing heat exchanger a detachable head affording complete and unrestricted access to all tube ends for inspection and repair.

It is a further object of the present invention to provide in the foregoing heat exchanger a novel tube sheet embodying all tube ends and nozzle connections for facilitating inspection and maintenance thereof.

These and other objects, advantages, and characterizing features of this invention will become clearly apparent from the ensuing detailed description of an illustrative embodiment thereof, taken together with the accompanying drawings wherein like reference characters denote like parts throughout the various views.

SUMMARY OF THE INVENTION

A heat exchanger including a shell having a fluid inlet tube and a fluid outlet tube. The shell is closed at one end and attached at its other end to one side of a tube sheet. A hollow detachable head is connected to the other side of the tube sheet and is provided with a partition separating the head into a first and second chamber. A tube bundle is mounted in said shell and is provided with inlets and outlets in said tube sheet communicating with said first and second chambers, respectively. A nozzle inlet and a nozzle outlet is formed in said tube sheet in fluid communication with said first and second chambers, respectively.

DETAILED DESCRIPTION OF THE PREFERRED EMBODIMENT

Figure 1:
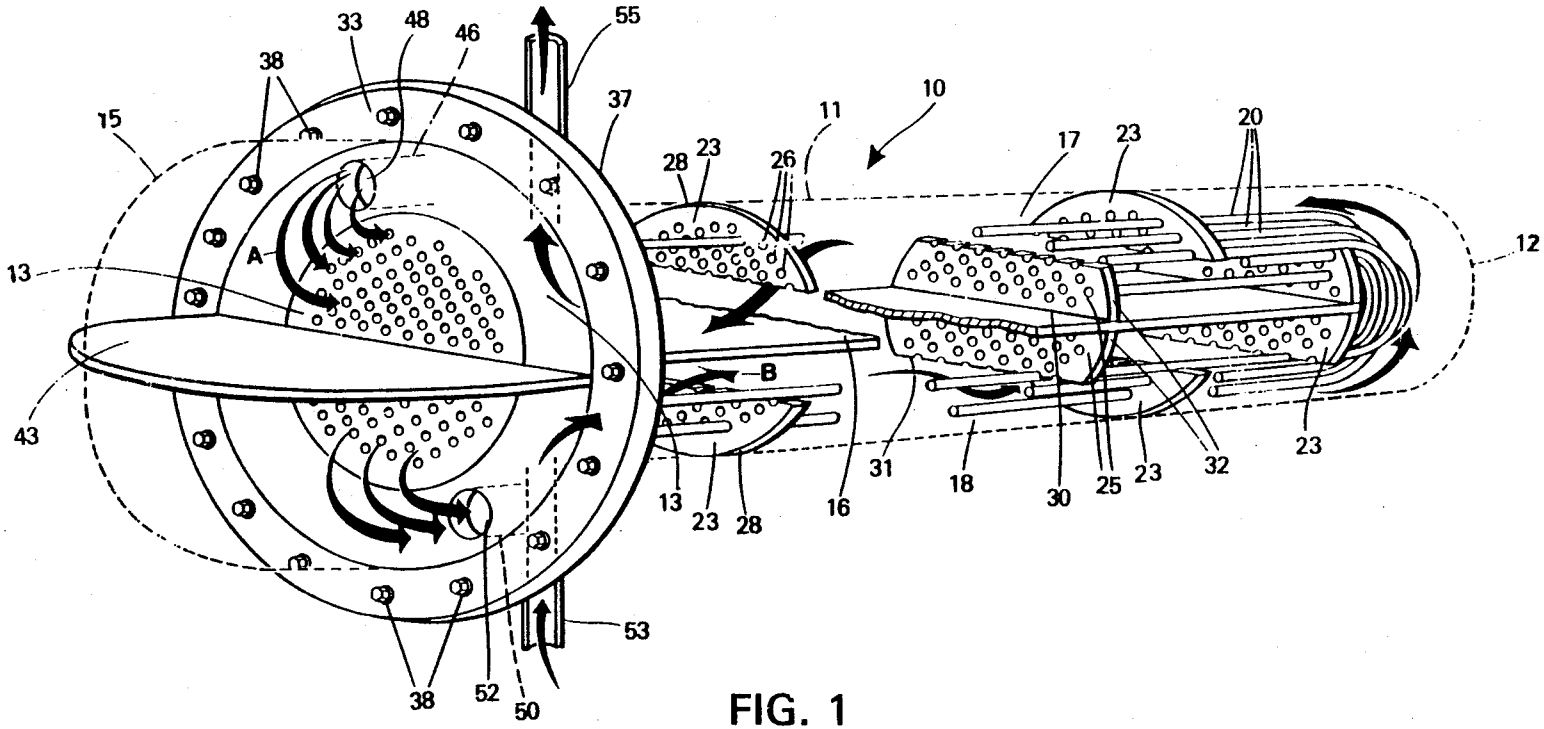
FIG. 1 is a perspective view, partly broken away, of a heat exchanger constructed in accordance with the principles of this invention, showing the head portion and shell in phantom for the sake of clarity.

Referring now in detail to the illustrative embodiment depicted in the accompanying drawings, there is shown in FIG. 1 a heat exchanger, comprehensively designated 10, constructed in accordance with this invention, and forming a part of a liquid lithium flow system (not shown). Liquid lithium is employed in an accelerated deuteron-lithium stripping reaction to generate a high energy neutron source in order to determine the effect of high energy neutrons on certain experimental materials. The lithium is heated to elevated temperatures during such reactions and is subsequently cooled by means of the heat exchanger of this invention. Since the lithium system forms no part of the present invention, it is believed that no further amplification or description thereof is necessary. Also, it should be understood that the heat exchanger of this invention is in no way restricted in use to a lithium circulating system, but has utility in any fluid flow system where it is desired to effect a heat transfer between fluids, and especially in those systems limiting or prohibiting human access.

The heat exchanger 10 comprises an elongated casing or shell 11 closed at one end 12 and welded or otherwise fixedly secured at its other end to a tube sheet 13. The tube sheet 13 is connected to a removable cover or head 15 to form a closed, unitary structure, as shown in phantom in FIG. 1. The unique construction of tube sheet 13 and head 15 together form a significant feature of the present invention as will hereinafter become apparent.

An elongated horizontally extending plate 16 is rigidly attached at its forward end (the left end as viewed in FIG. 1) to the tube sheet 13 and extends rearwardly therefrom toward closed end 12, terminating somewhat inwardly from such closed end 12 in axially spaced relation thereto. The lateral extent of plate 16 approximates the inner diameter of shell 11 with only sufficient clearance between the opposite lateral sides of plate 16 and the shell 11 to permit relative sliding movement therebetween for accommodating differential thermal expansion thereof. The plate 16 is located approximately midway of shell 11 and serves as a barrier, separating the shell 11 into an upper and lower compartment 17 and 18 communicating with each other at the rear end of shell 11. The terms forwardly, rearwardly, horizontally, upper and lower as used herein are applied only for ease of description with reference to FIG. 1, and should not be taken as limiting the scope of this invention, it being understood that the heat exchanger can be oriented in any desired attitude in use.

A plurality of tubes 20, forming a "tube bundle", are mounted within shell 11 and have their inlet ends rigidly secured to tube sheet 13. These tubes 20 form continuations of inlet openings 21 provided in the upper portion of tube sheet 13. The tubes 20 extend rearwardly through upper compartment 17 and are curved 180° adjacent the rear end of shell 11 to then extend forwardly through the lower compartment 18. The tubes 20 terminate in outlet ends rigidly secured to the tube sheet 13 and form continuations with outlet openings 22 provided in the lower portion of tube sheet 13.

The tubes 20 are supported in a series of longitudinally spaced baffles 23 and 25 provided with suitable openings 26 and 27 for receiving the tubes 20 in a fluid-tight relation. The baffles 23 are of partial circular configuration in plan and extend from the shell inner wall surface to approximately midway toward barrier plate 16. These baffles 23 have curved peripheral edges 28 complementary in shape to the internal wall surface of shell 11. However, baffles 23 are constructed in a manner allowing relative sliding movement between edges 28 and shell 11.

The baffles 25 are in the form of elongated segments extending transversely of the shell 11 and provided with inner longitudinal edges 30 in substantial abutment against barrier plate 16 but slidable relative thereto. The outer longitudinal edges 31 of baffles 25 are spaced vertically from the shell inner wall surface. The opposite ends of the baffles 25 are arcuately shaped, as at 32, to conform to the shape of the inner wall surface of shell 11 but can slide relative to the latter. Each pair of baffles 25 are mounted in a common transverse plane on opposite sides of barrier plate 16 and in axially spaced relation from baffles 23, also mounted in pairs in a common transverse plane on opposite sides of plate 16. Thus, baffles 23 and 25 function to support and separate the tubes 20 within shell 11 and also serve to direct the fluid to be cooled in a sinuous path through the compartments 17 and 18. The tubes 20 and baffles 23 and 25, herein referred to as a "tube bundle," are assembled as a unit and, as such, can expand axially relative to shell 11.

The detachable bonnet or head 15 is of generally hemispherical shape and has an integral annular flange 33 formed with a plurality of circumferentially spaced openings 35 adapted to be aligned with tapped openings 36 formed in the outer peripheral portion 37 of tube sheet 13. Suitable bolts 38 can then be inserted through openings 35 and threaded into the tapped openings 36 for firmly, but detachably securing the head 15 onto tube sheet 13. A deformable, metallic seal 39 is interposed between flange 33 and tube sheet portion 37 and is compressible upon tightening bolts 38 to provide pressure sealing therebetween. Since the head 15 is removable and replaceable remotely by manipulators, additional openings (not shown) can be formed in flange 33 to receive corresponding guide pins on tube sheet portion 37 for properly guiding and aligning the head 15 onto the sheet 13 when assembling the same. Also, lifting lugs 42 can be provided on the outer surface of head 15 to facilitate handling by the remotely controlled apparatus for removing and replacing head 15.

Figure 2:
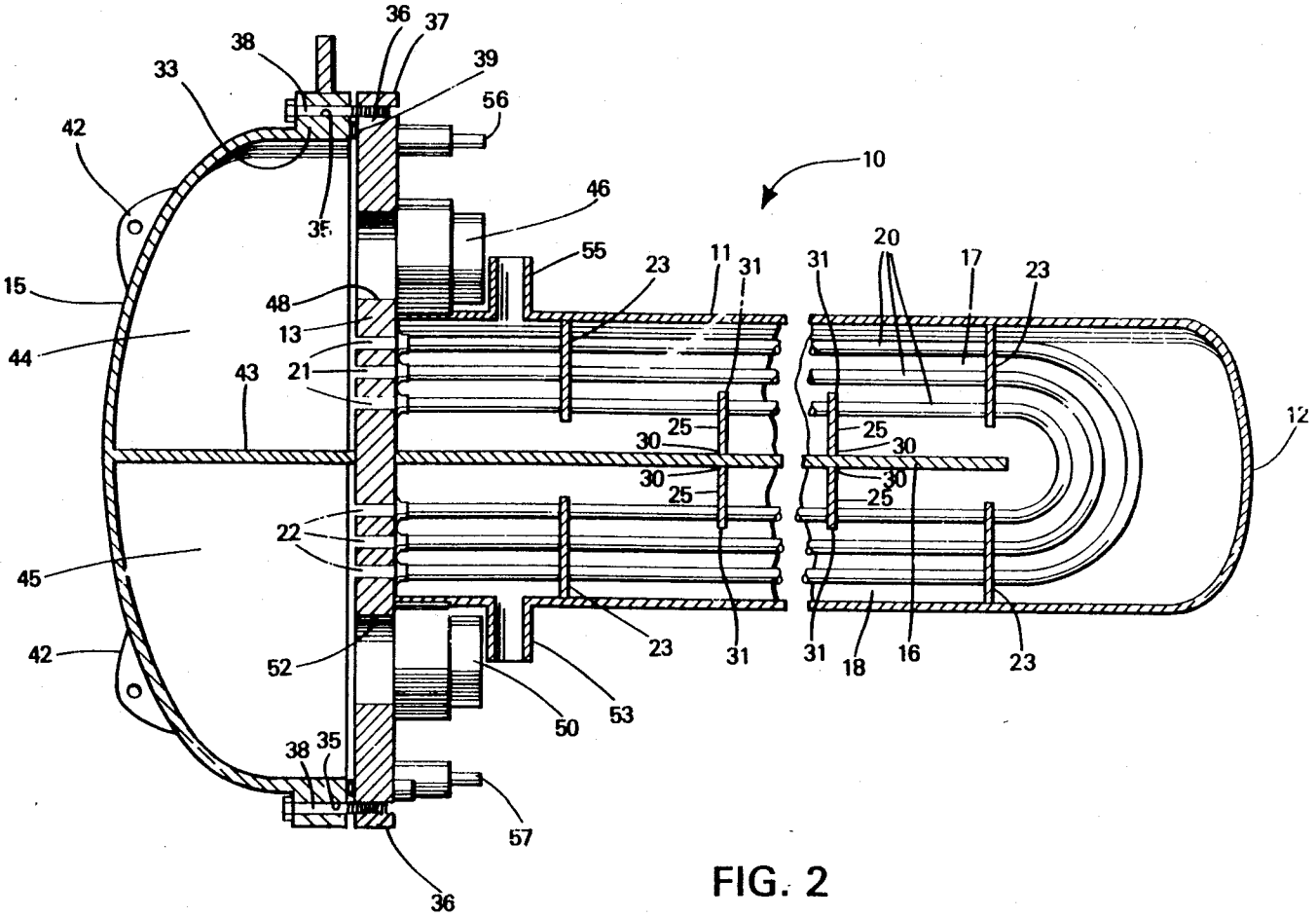
FIG. 2 is a longitudinal sectional view, on an enlarged scale and partly broken away, of the heat exchanger shown in FIG. 1, showing only a few of the many tubes incorporated therein.

An internal partition 43, formed integral with head 15 and located centrally thereof, extends in cantilever fashion from the apex of the inner wall surface of head 15 and is adapted to engage with a flush fit against the front face of tube sheet 13 in the assembled relation therewith as shown in FIG. 2. The partition 43 separates the interior of head 15 into an upper chamber 44 and a lower chamber 45.

An inlet nozzle 46, located exteriorly of shell 11, is connected to the rear side of tube sheet 13 and is provided with an inlet end forming a continuation of an enlarged opening 48 provided in the upper portion of tube sheet 13. Likewise, an outlet nozzle 50, located outwardly of shell 11, is connected to the rear side of tube sheet 13 with its inner end forming a continuation of an enlarged opening 52 in the lower portion of tube sheet 13. With head 15 properly secured to tube sheet 13, communication of flow is established from the inlet nozzle 46 to tubes 20 via enlarged opening 48, upper chamber 44 and inlet openings 21 and from the tube outlets 22 to outlet nozzle 50 via lower chamber 45 and enlarged opening 52.

Shell 11 is provided with an inlet tube 53 in the lower compartment 18 behind tube sheet 13 and an outlet tube 55 in the upper compartment 17, also behind tube sheet 13. The upper chamber 44 of head 15 is provided with a vent nozzle 56 for releasing any gases generated therein and the lower chamber 45 is provided with a drain nozzle 57 permitting complete discharge of any coolant therein prior to removing head 15. These nozzles 56 and 57 are connected via piping to suitable control values (not shown) located exteriorly of the enclosure for opening and blocking flow therethrough, as required.

In operation, an organic coolant is admitted into inlet nozzle 46 and directed, as indicated by arrows A, through upper chamber 44 into the openings 21 and the inlets of tubes 20. The coolant flows via tubes 20 rearwardly through the upper shell compartment 17, about barrier plate 16 and then forwardly through the lower shell compartment 18. The coolant exits the tubes 20 through outlet openings 22 into lower chamber 45 and then is discharged through outlet nozzle 50.

The coolant is cycled through the tube bundle for cooling a liquid, such as high temperature lithium, admitted into the shell 11 by means of inlet tube 53 suitably connected to the liquid lithium flow system. The lithium flows through shell compartment 18 in a sinuous path, as indicated by arrows B, about the baffles 23 and 25 and along the tubes 20 in heat exchange relation to the coolant flowing in a general opposite direction therein. The lithium flows upwardly and about the free end of barrier plate 16 adjacent the closed end 12 of shell 11, through upper shell compartment 17 in a sinuous path in heat exchange relation with the coolant flowing in a general opposite direction in tubes 20 and is then discharged at a reduced temperature through outlet tube 55 for return to the lithium flow system.

When desired or required to inspect or repair the tubes 20 via the tube sheet 13, the head 15 is easily and expediently detached by removing the bolts 38 and removing head 15 from tube sheet 13. This exposes the entire face of the tube sheet 13, including the several tube openings 21 and 22, as well as the coolant inlet and outlet openings 48 and 52, without in any way disturbing the piping connections for the tube side fluid, which may be the coolant as described in the preferred embodiment of this invention, or the fluid to be cooled, if desired. Thus, unrestricted access to all tube end openings is obtained for inspection and repair by remotely controlled manipulators.

The foregoing description of a preferred embodiment of this invention has been presented for purposes of illustration and description only, and it is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto

I claim:

1. A heat exchanger comprising: a unitary, one-piece shell having a fluid inlet tube and a fluid outlet tube, a tube sheet, said shell having a closed end and an open end directly attached to one side of said tube sheet, a hollow detachable head connected to the other side of said tube sheet and having a partition separating said head into a first and second chamber, a tube bundle comprised of a multiplicity of continuous U-shaped tubes mounted in and completely enclosed within said shell, said tubes having inlets formed in said tube sheet in fluid communication with said first chamber and outlets formed in said tube in fluid communication with said second chamber, a nozzle inlet connected to said one side of said tube sheet in fluid communication with said first chamber and a nozzle outlet connected to said one side of said tube sheet in fluid communication with said second chamber, said nozzle inlet and outlet being spaced radially from said tube bundle inlets and outlets and located exteriorly of said shell, and a plurality of longitudinally spaced baffles attached to said tubes for directing fluid flow between said tube inlets and outlets in a sinuous path.

2. A heat exchanger according to claim 1, including a barrier plate separating said shell into a first compartment connected to said inlet tube and a second compartment connected to said outlet tube.

3. A heat exchanger according to claim 2, wherein said first and second compartments are in fluid communication with each other adjacent said shell closed end.

4. A heat exchanger according to claim 2, wherein said inlet and outlet tubes are located adjacent said tube sheet.

5. A heat exchanger according to claim 2, wherein said U-shaped tubes pass through said first and second compartments.

6. A heat exchanger according to claim 5, wherein said plurality of lontidudinally spaced baffles are mounted in said first and second compartments for supporting said tubes and directing fluid flow between said inlet and outlet tubes in a sinuous path successively through said compartments in heat exchange relation with the fluid flowing through said tubes.

7. A heat exchanger according to claim 1, wherein said partition is formed integral with said head and extends therefrom into engagement with said other side of said tube sheet.

* * * * *